(12) United States Patent
McLane et al.

(10) Patent No.: US 6,688,333 B2
(45) Date of Patent: Feb. 10, 2004

(54) AUTOMOTIVE COOLANT CONTROL VALVE

(75) Inventors: Allan McLane, Dublin, OH (US); William D. Kramer, Powell, OH (US)

(73) Assignee: Ranco Incorporated of Delaware, Wilmington, DE (US)

(*) Notice: Subject to any disclaimer, the term of this patent is extended or adjusted under 35 U.S.C. 154(b) by 0 days.

(21) Appl. No.: 10/248,767

(22) Filed: Feb. 14, 2003

(65) Prior Publication Data

US 2003/0106595 A1 Jun. 12, 2003

Related U.S. Application Data

(62) Division of application No. 09/997,118, filed on Nov. 28, 2001.

(51) Int. Cl.$^7$ .............................................. F16K 11/085
(52) U.S. Cl. .................. 137/625.11; 123/41.1
(58) Field of Search .................. 137/625.11, 625.47; 123/41.08, 41.1; 236/74 R, 76, 78, 34.5; 237/12.3 G, 5; 251/313

(56) References Cited

U.S. PATENT DOCUMENTS

| | | | |
|---|---|---|---|
| 1,339,284 A | | 5/1920 | Petry |
| 1,642,296 A | * | 9/1927 | Brant .................... 137/625.29 |
| 2,905,158 A | | 9/1959 | Lacefield et al. |
| 2,972,357 A | | 2/1961 | Ford et al. |
| 3,190,584 A | | 6/1965 | Gire et al. |
| 3,227,372 A | * | 1/1966 | Prokupek et al. ............. 237/59 |
| 3,395,046 A | | 7/1968 | Levine et al. |
| 3,587,649 A | * | 6/1971 | Lechler .................... 137/625.4 |
| 3,964,728 A | * | 6/1976 | Flider .......................... 251/310 |
| 4,285,365 A | | 8/1981 | Coats et al. |
| 4,427,057 A | * | 1/1984 | Bouvot ....................... 123/41.1 |
| 5,095,855 A | * | 3/1992 | Fukuda et al. ........... 123/41.44 |
| 5,131,431 A | | 7/1992 | Vullmahn |
| 5,529,026 A | * | 6/1996 | Kurr et al. .................. 123/41.1 |
| 5,607,294 A | | 3/1997 | Gianpiero et al. |
| 5,617,815 A | * | 4/1997 | Spies et al. ................ 123/41.1 |
| 5,848,611 A | | 12/1998 | Stanevich |
| 5,893,392 A | | 4/1999 | Spies et al. |
| 5,934,642 A | | 8/1999 | Pearson et al. |
| 5,950,576 A | | 9/1999 | Busato et al. |
| 6,164,248 A | * | 12/2000 | Lehmann ................... 123/41.1 |
| 6,213,060 B1 | | 4/2001 | Kuze |
| 6,230,668 B1 | | 5/2001 | Marsh et al. |
| 6,257,177 B1 | * | 7/2001 | Lehmann ................. 123/41.44 |
| 6,289,913 B1 | * | 9/2001 | Babin ....................... 137/15.18 |
| 6,315,267 B1 | | 11/2001 | Zajac et al. |

FOREIGN PATENT DOCUMENTS

| | | |
|---|---|---|
| EP | 0639736 A1 | 4/1994 |
| EP | 1197644 A1 | 4/2002 |
| FR | 2800125 A1 | 4/2001 |

* cited by examiner

*Primary Examiner*—John Fox
(74) *Attorney, Agent, or Firm*—Blackwell Sanders Peper Martin, LLP

(57) ABSTRACT

A coolant flow valve for controlling the distribution and flow of coolant to replace the radiator thermostat and heater valve currently used in automotive applications. The valve includes a valve rotor rotationally received in a valve housing wherein the rotational orientation thereof determines which combination of flow paths through four different outlet ports is selected.

41 Claims, 7 Drawing Sheets

AUTOMOTIVE COOLANT CONTROL VALVE

CROSS REFERENCE TO RELATED APPLICATIONS

This patent application is a divisional application of U.S. patent application Ser. No. 09/997,118 filed Nov. 28, 2001, currently pending.

BACKGROUND OF INVENTION

The present invention generally relates to a valve for controlling the flow of fluid and more particularly pertains to a valve for simultaneously controlling the distribution and flow of an automobile's coolant through multiple flow paths.

Water-cooled internal combustion engines that are used in automobiles rely on a fluid to carry excess heat from the engine to an external heat exchanger commonly referred to as the radiator. Such coolant is continuously recirculated through the engine until its temperature exceeds a preselected level at which point a portion of the flow is routed through the heat exchanger. The flow to the radiator is continuously adjusted in order to maintain the temperature of the coolant within a desired range. The heat carried by the fluid is also used to heat the interior of the automobile whereby a portion of the circulating coolant is routed through a second heat exchanger positioned so as to heat air that is directed into or recirculated within the passenger compartment.

The distribution of the flow of coolant that is generated by an engine-driven water pump is typically controlled by two separate components, namely a radiator thermostat and a heater valve. Heretofore used thermostats typically rely on a mechanism that causes the force generated by the expansion of mass of wax-like material to overcome the bias of a spring to open a valve wherein the wax-like material expands as a function of temperature. The entire device is immersed in the flow of coolant and is positioned and configured so as to block off the flow of coolant to the radiator when the valve is closed. While the valve is in its closed position, the coolant continues to circulate but is forced to bypass the radiator and is redirected back into the engine's water passages. A number of disadvantages are associated with this type of configuration including, but not limited to, the fact that the bypass flow path remains open at all times and that a portion of the flow of coolant therefore always bypasses the radiator even if maximum cooling is called for. Additionally, the positioning of the thermostat directly in the flow path of the coolant poses an impediment to the flow of coolant and thereby compromises the efficiency of the cooling system while the failure of the opening mechanism typically results in the thermostat remaining in its closed configuration which can quickly lead to engine damage. Another disadvantage inherent in heretofore used thermostat configurations is the fact that the device can necessarily only respond to the temperature of the coolant rather than directly to the temperature of the engine, let alone the anticipated cooling needs of the engine. The engine temperature may therefore not necessarily be optimized for a variety of conditions, which may result in decreased fuel efficiency and increased exhaust emissions.

Heater valves are typically positioned so as to direct a portion of the flow of coolant to a heater core positioned within the HVAC system of the automobile. Early heating systems included a valve that was simply actuated by a cable extending from a lever positioned in the interior of the automobile. Many modern systems employ computer controlled servo operated valves, wherein the valve position is either modulated so as to control the temperature of the heater or subject to either a fully open or fully closed position wherein air heated by the heater is subsequently mixed with cooled air to regulate the temperature within the passenger compartment.

A difficulty associated with this heretofore approach toward controlling the flow and distribution of coolant is inherent in the fact that, in effect, two independently operating systems are affecting the temperature of a common coolant. A change in the demand for heat within the passenger cabin will effect the temperature of the coolant as will the position of the thermostat. A change in one will necessarily induce a change in the other and without a common control system, the temperature may tend to fluctuate and dither. Variations in engine load, especially in for example, stop-and-go traffic will introduce even more fluctuation as the heat fed into the system will additionally be subject to variation. Increasingly strict emission regulations and demands for higher fuel efficiencies require the engine to operate in narrower temperature ranges which requires a more precise control of coolant temperature. An improved cooling system is needed with which coolant temperature and hence engine and heater temperature can be more precisely controlled.

SUMMARY OF INVENTION

The valve of the present invention overcomes the shortcomings of previously known coolant flow and distribution control systems. A single valve replaces the presently used separate thermostat and heater valve devices and provides for the comprehensive control of the routing and flow of circulating coolant. The valve controls the flow of coolant to the radiator, the amount of flow that bypasses the radiator to be reintroduced into the engine's cooling passages, the flow of coolant to the heater and additionally provides for the degassing of the coolant flowing through the valve. All such functions are achieved by a single valve as described herein.

The valve of the present invention includes a valve rotor that is rotationally received within a valve housing. The housing includes an inlet and a number of outlet ports formed therein while the valve rotor has a number of conduits extending therethrough that serve to set the inlet port into fluid communication with a selected combination of outlet ports as a function of the rotational orientation of the valve rotor within the valve housing.

More particularly, the valve of the present invention is configured such that the ports that are formed in the cylindrical valve housing are arranged along at least two planes that are spaced along the axis of the housing. A first plane may include the inlet port and an outlet port for flow to the radiator. Ports arranged along a second plane may include a heater outlet port and a bypass port. A port for carrying gas bubbles may be formed in an end of the cylindrical housing. The conduits formed in the valve rotor are arranged such that selected conduits become aligned with selected ports as a function of the rotational orientation of the valve rotor within the valve housing. An internal conduit extends along the axis of the valve rotor so as to interconnect conduits that are arranged along the two planes.

The precise rotational orientation of the valve rotor within the valve housing required to achieve a certain distribution and flow of coolant may be achieved by the operation of a stepper motor. Inputs received from one or more temperature sensors and from an operator with regard to a selected heater temperature may be interpreted by a microprocessor to generate a signal necessary to drive the motor to a desired position. A mechanical spring may additionally be employed to force the valve rotor to assume a rotational orientation for providing maximum flow to the radiator thereafter in the event a failure of the electronics takes place to serve as a fail safe mode.

These and other features and advantages of the present invention will become apparent from the following detailed description of a preferred embodiment which, taken in conjunction with the accompanying drawings, illustrates by way of example the principles of the invention.

DETAILED DESCRIPTION

The valve of the present invention replaces a conventional radiator thermostat and heater valve that are typically employed in modern automobiles. The valve controls the flow and distribution of coolant to the radiator, radiator bypass and heater and may optionally control the degassing of the coolant.

Figure 1:
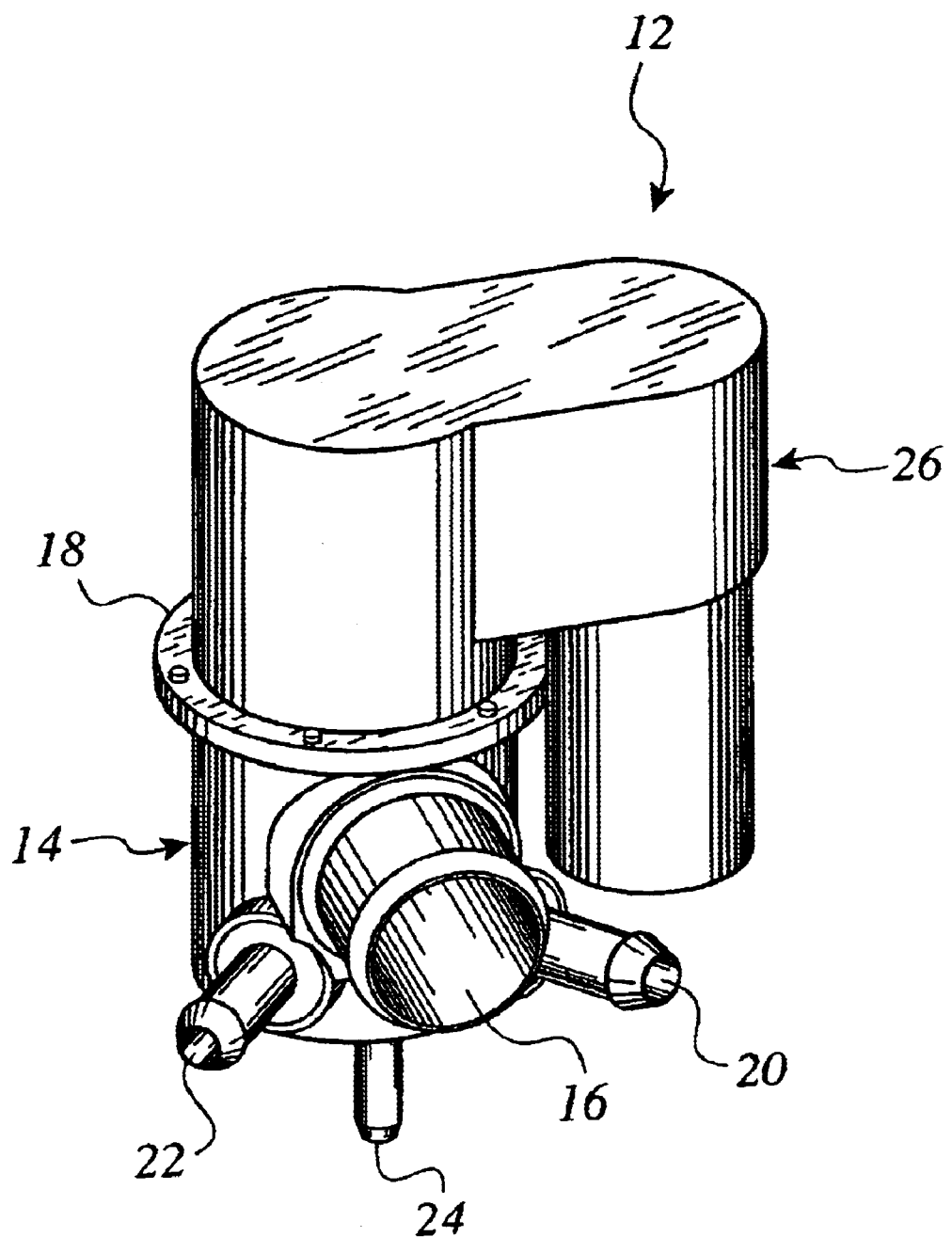
FIG. 1 is a perspective view of a valve assembly that includes a preferred embodiment of the valve of the present invention.

FIG. 1 is a perspective view of a valve assembly 12 that includes the valve 14 of the present invention. The valve controls the flow of coolant therethrough, wherein coolant entering through inlet port 16 is distributed via a preselectable combination of outlet ports 18, 20, 22, and 24. Setting the inlet port into fluid communication with a desired combination of outlet ports is achieved via the operation of an associated drive mechanism 26, which may take the form of a stepper motor and reduction gear combination.

Figure 2:
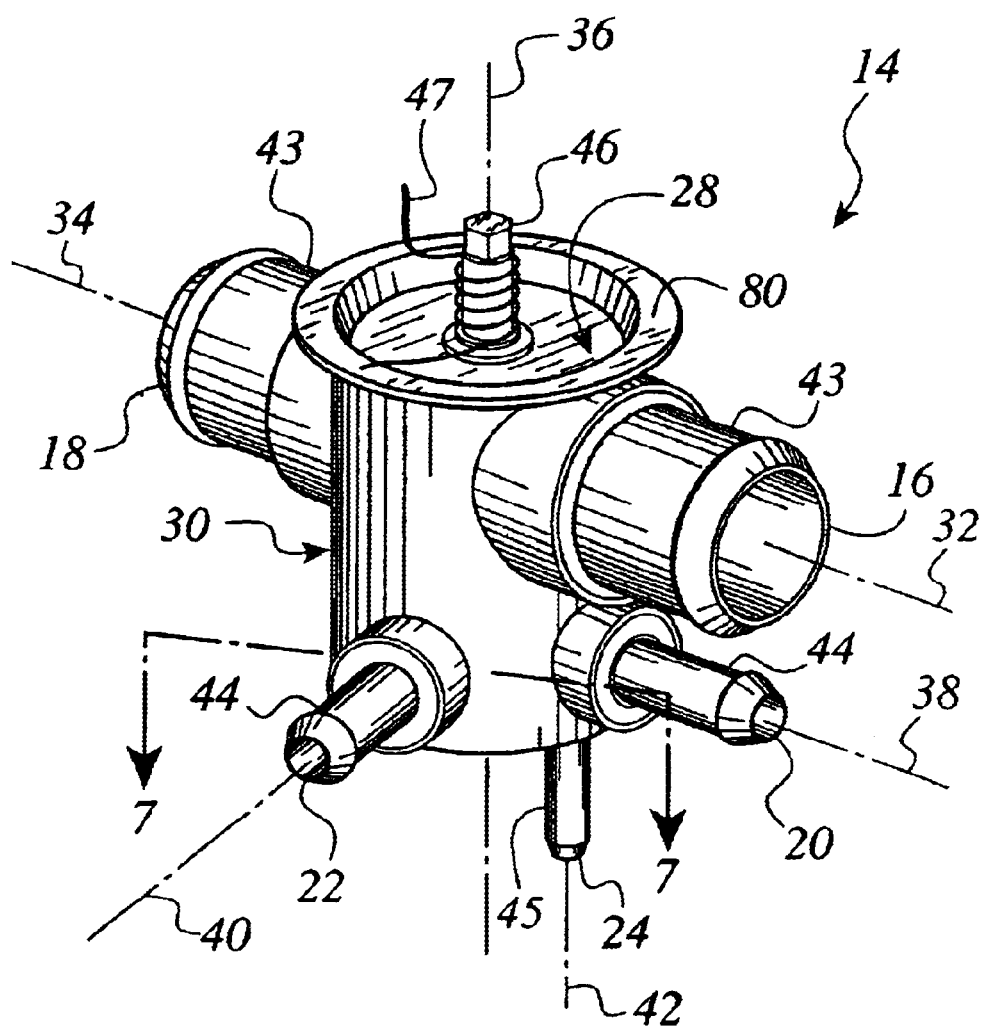
FIG. 2 is a perspective view of the valve.

FIG. 2 is a perspective view of the valve 14 sans drive mechanism. The valve includes a valve rotor 28 that is rotationally received within a valve housing 30. The valve housing has a plurality of ports formed therein, including an inlet port 16, a radiator port 18, a bypass port 20, a heater port 22 and a degassing port 24. Each of the ports extend through the wall of the housing to define a conduit to its interior. The axis 32 of the inlet port and the axis 34 of the radiator port are aligned with one another and lie on a first plane that is perpendicular to the central axis 36 of the cylindrical valve. The axis 38 of the bypass port and the axis 40 of the heater port lie on a second plane that is perpendicular to the central axis wherein such second plane is axially displaced relative to the first plane. The axis 42 of the degassing port extends from the base of the valve housing, is generally parallel to the central valve axis 36, and radially offset therefrom. In the embodiment illustrated, each of the ports has a length of barbed tubing 43, 44 and 45 of appropriate length and diameter extending therefrom configured for receiving a coolant carrying hose or line that may be fitted and clamped thereto. The rotational orientation of the valve rotor within the valve housing determines which outlet ports are set into fluid communication with the inlet port. A shaft 46 extends from one end of the valve rotor along its axis 36 to facilitate its rotation by the drive mechanism. A return spring 47 disposed about the shaft serves to bias the valve rotor into a preselected rotational orientation relative to the valve housing.

Figure 3:
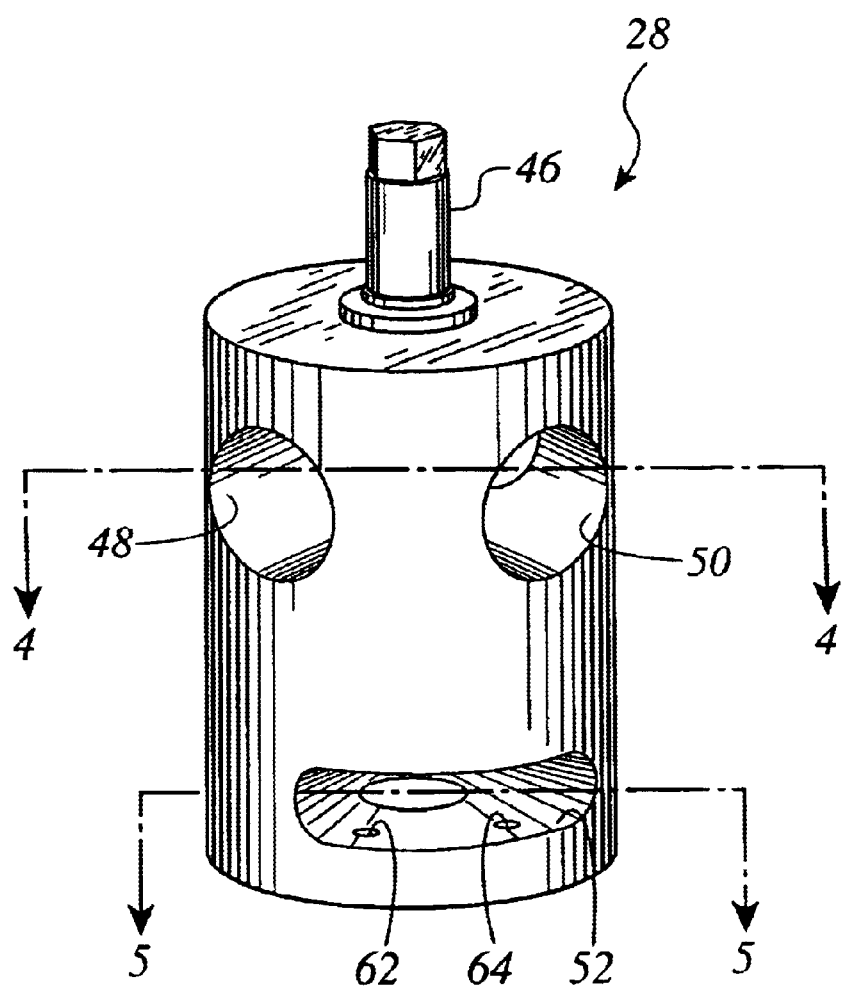
FIG. 3 is a perspective view of the valve rotor.

FIG. 3 is a perspective view of the valve rotor 28 of the valve 14 of the present invention. The valve rotor has a number of internal fluid passages formed therein that are interconnected to one another within the interior of the valve rotor and to various openings 48, 50 and 52 formed on the surface of the valve rotor. The openings are circumferentially, as well as axially spaced relative to one another in precisely defined locations so as to become aligned with selected ports formed in the valve housing 30 at preselected rotational orientations of the valve rotor relative to the valve housing.

Figure 4:
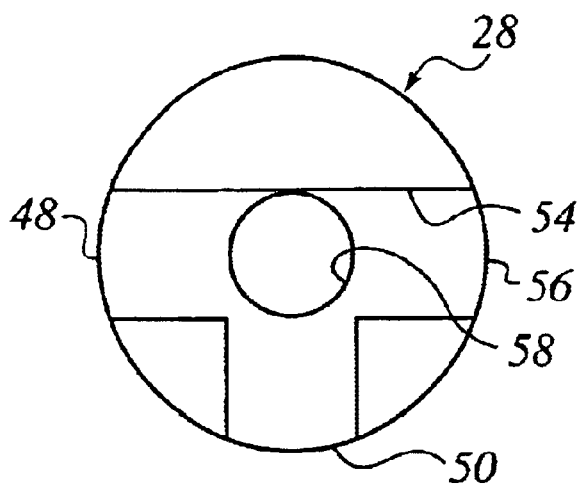
FIG. 4 is a cross-sectional view of the valve rotor taken along lines 4—4 of FIG. 3.

FIG. 4 is a cross-sectional view of valve rotor 28 taken along lines 4—4 of FIG. 3. Clearly visible is a T-shaped fluid passage 54 formed therein that extends through the interior of the valve rotor and to its surface via openings 48, 50 and 56. A central fluid passage 58 extends down along the central axis of the valve rotor. The rotational orientation of the valve rotor within the valve housing 30 will determine which of the openings 48, 50 and 56 is to be set into fluid communication with radiator port 18 and what percentage of the cross-sectional area of such opening is to be aligned therewith.

Figure 5:
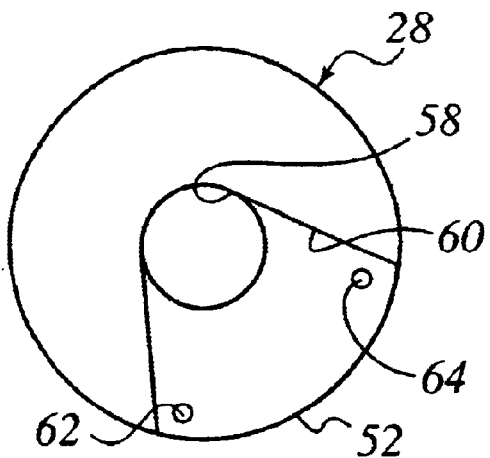
FIG. 5 is a cross-sectional view of the valve rotor taken along lines 5—5 of FIG. 3.
Figure 6:
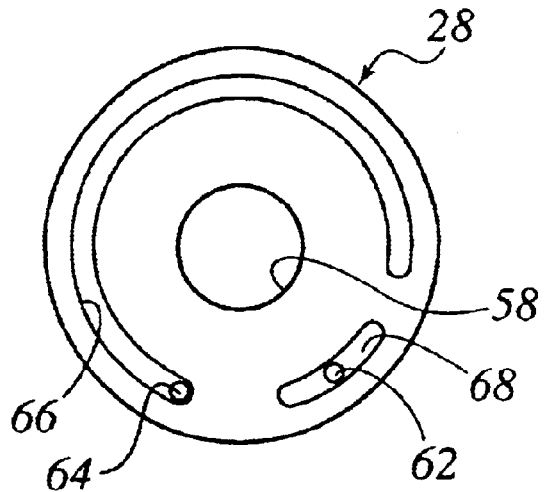
FIG. 6 is a bottom plan view of the valve rotor shown in FIG. 3.

FIG. 5 is a cross-sectional view of the valve rotor 28 taken along lines 5—5 of FIG. 3. The pie-shaped fluid passage 60 serves to set the central fluid passage into fluid communication with the elongated opening 52 formed on the surface of the rotor as well as with the small axially extending fluid passages 62, 64. The rotational orientation of the valve rotor within the valve housing 30 will determine whether the bypass port 20 or the heater port 22 or both ports, are to be aligned with all or a portion of opening 52. FIG. 6 is a bottom plan view of the valve rotor 28 showing the two grooves 66 and 68 formed in the base of the component. The grooves are in fluid communication with fluid passages 62 and 64 which extend into fluid passage 60. The rotational orientation of the valve rotor within the valve housing 30 will determine whether one of the grooves is set into fluid communication with the degassing port 24 formed in the base of the valve housing.

Figure 7:
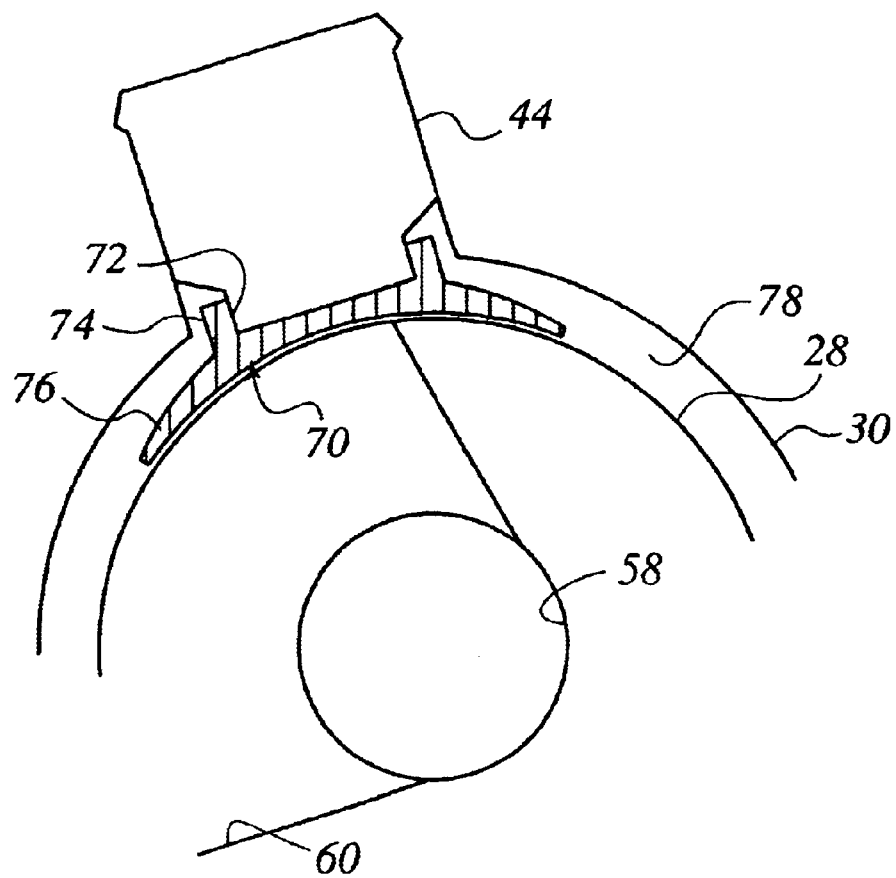
FIG. 7 is an enlarged cross-sectional view taken along lines 7—7 of FIG. 2.

Seals are fitted about each of the outlet ports so as to limit the flow of fluid therethrough to only fluid that issues from an opening formed in the valve rotor 28 that is wholly or partially aligned therewith. FIG. 7 is an enlarged cross-sectional view taken along line 7—7 of FIG. 2 illustrating the seal configuration employed for heater port 22 which is identical to that which is employed for the radiator port 18 as well as the bypass port 20. Each of such ports includes a section of tubing 44 (or 43 or 45) that extends outwardly and is configured for receiving and retaining a hose or other conduit clamped thereto. Each such section of tubing includes a neck portion 72 of reduced diameter disposed near its proximal end that terminates so as to be approximately aligned with the inner diameter of the valve housing 30. A flexible seal 70 includes a collar 74 which is tightly fitted about the neck portion as well as a flange 76 that engages the surface of the valve rotor 28. The seal is configured such that the coolant which is present in the space 78 between the valve rotor and the valve housing serves to backload the seal so as to urge the flange against the valve rotor and thereby form an effective seal. A simple O-ring (not shown) serves to form a seal about the proximal end of the degassing port 24. A simple gasket (not shown) serves to form a seal between the upper flange 80 of the valve housing and a cooperating surface that may extend from the enclosure for the drive mechanism.

In use, the valve of the present invention is plumbed such that the inlet port 16 receives the output from the water pump that is used to circulate an engine's coolant. The pump may comprise an engine driven or electrically driven device. The radiator port 18, bypass port 20 and heater port 22 are each plumbed to the respective components while the degassing port 24 is plumbed so as to most advantageously remove bubbles from the circulating coolant as is appropriate for a particular cooling system such as by connection to an overflow tank. Conventional hoses and hose clamps may be used to make the various connections. Any of a wide variety of control configurations may be employed to rotate the valve rotor 28 within the valve housing 30 in order to achieve a desired effect. A microprocessor receiving inputs from various sensors, including for example temperature sensors, as well as input from an operator, including for example a desired cabin temperature setting, determines which rotational orientation of the valve rotor within the valve housing would provide the appropriate amount of coolant flow through the various flowpaths. The drive mechanism can then be provided with the appropriate signal in order to rotate the valve rotor into the proper orientation.

Figure 8:
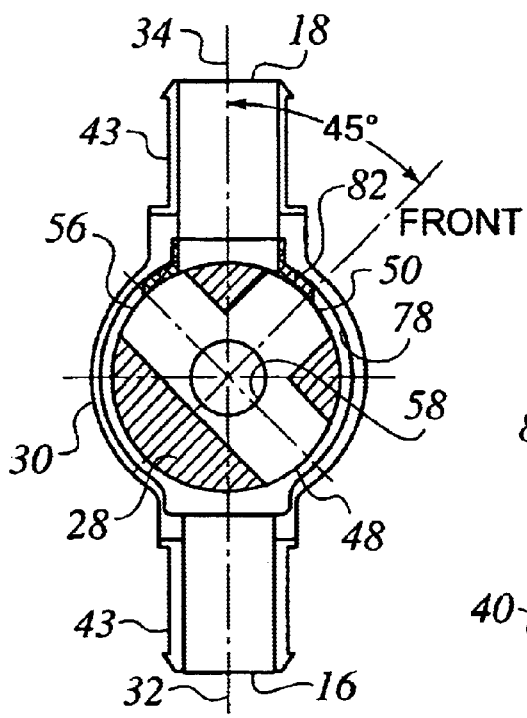
FIG. 8 is a cross-sectional view of the valve rotor within the valve housing taken along the same plane as illustrated in FIG. 4 and rotated to its maximum counter-clockwise rotational orientation.
Figure 9:
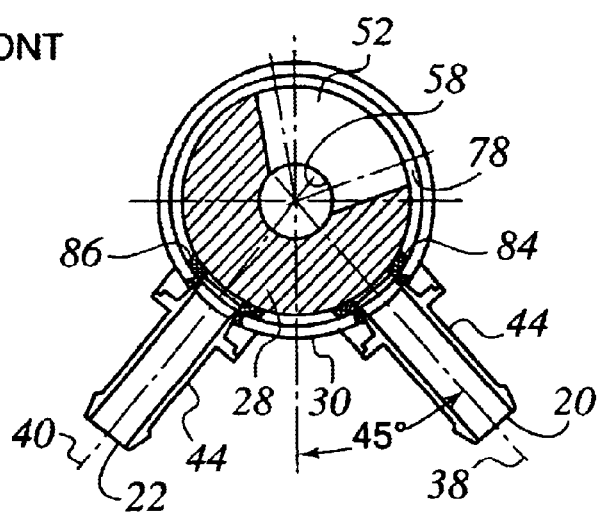
FIG. 9 is a cross-sectional view of the valve rotor within the valve housing taken along the same plane as is illustrated in FIG. 5 and in the same rotational orientation of the valve rotor vis-a-vis the valve housing as is shown in FIG. 8.

FIGS. 8 and 9 are cross-sectional views of a preferred embodiment of the valve of the present invention wherein the valve housing 28 is rotated to its extreme counterposition within the valve housing 30. FIG. 8 is a cross-sectional view along the plane that includes the axis 32 of the inlet port 16 and the axis 34 of the radiator port 18. FIG. 9 is a cross-sectional view along the plane that includes the axis 38 of the bypass port 20 and the axis 40 of the heater port 22. Fluid entering inlet port 16 is free to enter the valve rotor 28 through any of the unobstructed openings. While the most direct path is via opening 48, the gap 78 between the valve rotor and the valve housing also provides fluid paths to openings 50, 52 and 56. In this particular rotational orientation only a small percentage of one of the outlet ports, namely radiator port 18 is aligned with openings (50 and 56) formed in the valve rotor. Radiator port seal 82 prevents unobstructed flow along gap 78 into the radiator port while bypass port seal 84 and heater port seal 86 precludes any flow into the respective ports.

Figure 10:
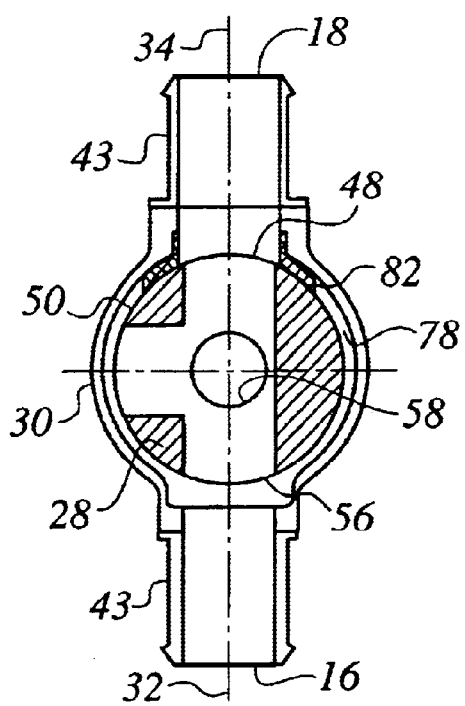
FIG. 10 is a cross-sectional view of the valve rotor within the valve housing taken along the same plane as is illustrated in FIG. 4 and in its maximum clockwise rotational orientation.
Figure 11:
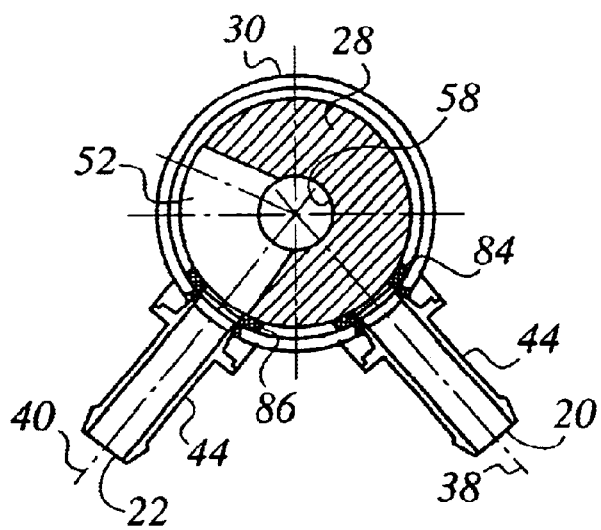
FIG. 11 is a cross-sectional view of the valve rotor within the valve housing taken along the same plane as is illustrated in FIG. 5 and in the same rotational orientation of the valve rotor vis-a-vis the valve housing as is shown in FIG. 10.

FIGS. 10 and 11 are cross-sectional views of a preferred embodiment of the valve of the present invention wherein the valve housing 28 is rotated to its extreme clockwise position within the valve housing 30 which represents a rotation of approximately 225 degrees from the rotational orientation shown in FIGS. 8 and 9. FIG. 10 is a cross-sectional view along the plane that includes the axis 32 of the inlet port 16 and the axis 34 of the radiator port 18. FIG. 11 is a cross-sectional view along the plane that includes the axis 38 of the bypass port 20 and the axis 40 of the heater port 22. Fluid entering inlet port 16 is free to enter the valve rotor 28 through any of the unobstructed openings. While the most direct flow path is via opening 56, the gap 78 between the valve rotor and the valve housing also provides flow paths to openings 50 and 52. In this particular rotational orientation an unobstructed flow path is provided to both the radiator via opening 48 and radiator port 18 and to the heater via central fluid passage 58, opening 52 and heater port 22. Flow to the bypass port 20 is completely blocked off and sealed by bypass port seal 84. As such, this rotational orientation provides for maximum engine cooling and is used as a default or failsafe mode. In the event of a controller or other electrical malfunction, mechanical spring 47 serves to rotate the valve rotor into this orientation.

Figure 12:
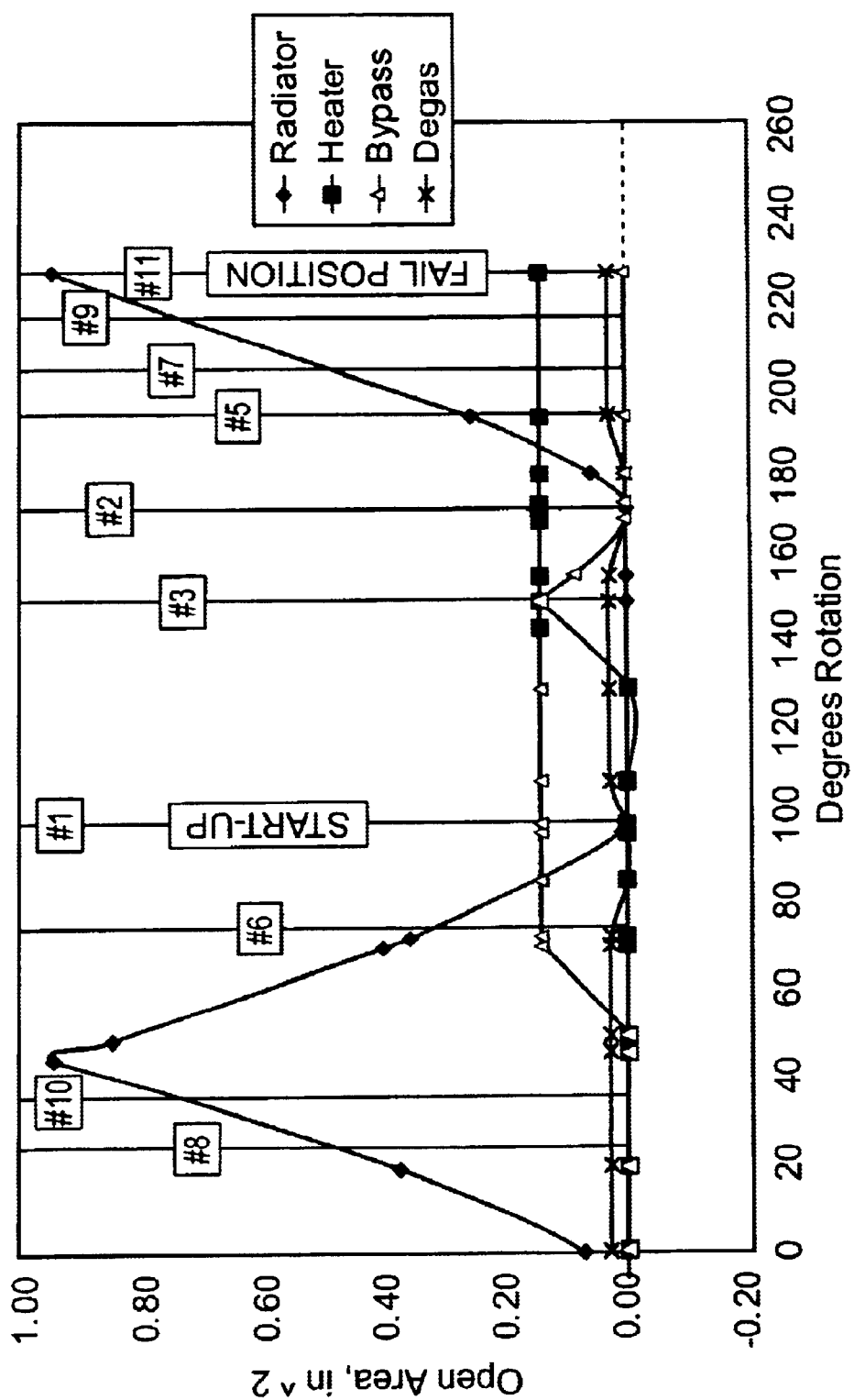
FIG. 12 is a graphic representation of the various flow paths as a function of rotational orientation.

FIG. 12 is graphic representation of the various flow paths that are established as a function of the rotational orientation of the valve rotor 28 within the valve housing 30. The horizontal axis represents the rotational orientation of the valve rotor in degrees while the vertical axis represents the approximate open area that is available for the four different outlets.

The radiator outlet is denoted by diamonds, the heater by the squares, the bypass by the triangles and the degas by the "X's". The cross-sectional illustrations of FIGS. 8 and 9 are represented by the 0 degree position while the cross-sectional illustrations of FIGS. 10 and 11 are represented by the 225 degree position.

The valve configuration of the present invention allows a variety of different flow path combinations to be selected, including:

a. Bypass only with Degas closed;
b. Heater only with Degas closed;
c. Heater and Bypass open with Degas open;
d. Bypass open with Radiator blended and Degas open;
e. Heater open with Radiator blended and Degas open;
f. Radiator blended from 10% open to 100% open with Degas open; and
g. Radiator open, Heater open, Degas open and Bypass closed.

A controller can be configured to select various rotational orientations pursuant to various scenarios and conditions. Examples of such scenarios and conditions and the corresponding orientational selections include the following (wherein the index numbers correspond to the boxed numbers shown in FIG. 12):

[t1]

| | Potential Cold Day Scenario | | | | |
|---|---|---|---|---|---|
| IN-DEX | MODE | RADIATOR | HEAT-ER | BY-PASS | DE-GAS |
| 1 | Warm up < 95 C | OFF | OFF | 100% | OFF |
| 2 | Warm up = 95 C before OEM Degas shutoff time on Cold Day | OFF | 100% | OFF | OFF |
| 3 | Warm up > 95 C | OFF | 100% | 100% | 100% |

-continued

Potential Cold Day Scenario

| IN-DEX | MODE | RADIATOR | HEATER | BY-PASS | DE-GAS |
|---|---|---|---|---|---|
|  | after OEM Degas shutoff time on Cold Day |  |  |  |  |
| 5 | Transition on Cold Day | 1% to 25% | 100% | OFF | 100% |
| 7 | Economy on Cold Day | 35% to 80% | 100% | OFF | 100% |
| 9 | Power on Cold Day | 50% to 100% | 100% | OFF | 100% |
| 11 | Engine Off/Overheat | 100% | 100% | OFF | 100% |

Potential Warm Day Scenario

| IN-DEX | MODE | RADIATOR | HEATER | BY-PASS | DE-GAS |
|---|---|---|---|---|---|
| 1 | Warm up < 95 C | OFF | OFF | 100% | OFF |
| 6 | Transition on Warm Day | 1% to 25% | OFF | 100% | 100% |
| 8 | Economy on Hot Day | 35% to 80% | OFF | OFF | 100% |
| 10 | Power on Hot Day | 50% to 100% | OFF | OFF | 100% |
| 11 | Engine Off/Overheat | 100% | 100% | OFF | 100% |

The valve of the present invention may be formed from any of a variety of different materials. For example, the valve rotor may preferably be formed of an acetal copolymer known as celcon while the valve housing may be formed of a nylon thermoplastic. Other plastics may alternatively be used. As a further alternative, a metal may be used in the fabrication of one or both of the major components.

While a particular form of the invention has been illustrated and described, it will also be apparent to those skilled in the art that various modifications can be made without departing from the spirit and scope of the invention. The valve may be adapted for use in any of a variety of water-cooled engines, may be mounted in any of a variety of spatial orientations, including but not limited to an inverted orientation, may used with any of a variety of devices for selecting rotational orientations based on a multitude of inputs while the valve rotor may be rotated into position with any of a variety of drive mechanisms. Accordingly, it is not intended that the invention be limited except by the appended claims.

What is claimed is:

1. A valve for distributing and regulating the flow of coolant issuing from a water pump to a radiator, a bypass circuit and a heater, comprising:
   a valve housing having ports formed therein including an inlet port configured to receive coolant issuing from a water pump, a first outlet port configured to direct coolant to a radiator, a second outlet port configured to direct coolant to a bypass circuit and a third outlet port configured to direct coolant to a heater; and
   a valve rotor rotationally disposed within the valve housing, having a plurality of internal fluid passages and configured to set the inlet port in fluid communication with a selected combination of the outlet ports.

2. The valve of claim 1, further comprising an electric motor for driving the valve rotor into preselected rotational orientations within the valve housing.

3. A valve for distributing and regulating the flow of coolant issuing from a water pump to a radiator, a bypass circuit and a heater, comprising:
   a valve housing having ports formed therein including an inlet port configured to receive coolant issuing from a water pump, a first outlet port configured to direct coolant to a radiator, a second outlet port configured to direct coolant to a bypass circuit and a third outlet port configured to direct coolant to a heater; and
   a valve rotor rotationally disposed within the valve housing configured to set the inlet port in fluid communication with a selected combination of the outlet ports, wherein the valve inlet port and the radiator port are formed in diametrically opposed locations in the valve housing and the valve rotor has a first fluid passage formed therein configured to become aligned with the inlet port and the radiator port at a preselected rotational orientation so as to provide a linear and unobstructed flow path for coolant through the valve.

4. The valve of claim 3, wherein the bypass port and the heater port are arranged so as to define a plane perpendicular to a rotational axis of the valve rotor and wherein such plane is axially spaced from the inlet and radiator ports.

5. The valve of claim 4, wherein the valve rotor has fluid passages formed therein that allow the inlet port to be set into fluid communication with the radiator port and the heater port while blocking flow to the bypass port.

6. The valve of claim 5, further comprising a spring for biasing the valve rotor to a rotational orientation wherein the inlet port is set into fluid communication with the radiator port while blocking flow to the bypass port.

7. The valve of claim 4, wherein the valve rotor has fluid passages formed therein to allow the inlet port to be set into fluid communication with the radiator port while blocking flow to the heater port and the bypass port.

8. The valve of claim 4, wherein said valve rotor has fluid passages formed therein to allow the inlet port to be set into fluid communication with the heater port while blocking flow to the radiator port and the bypass port.

9. A valve for distributing and regulating the flow of coolant issuing from a water pump to a radiator, a bypass circuit and a heater, comprising:
   a valve housing having ports formed therein including an inlet port configured to receive coolant issuing from a water pump, a first outlet port configured to direct coolant to a radiator, a second outlet port configured to direct coolant to a bypass circuit and a third outlet port configured to direct coolant to a heater; and
   a valve rotor rotationally disposed within the valve housing configured to set the inlet port in fluid communication with a selected combination of the outlet ports, further comprising a degassing port formed in the valve housing and the valve rotor has a fluid passage formed therein for setting the inlet port into fluid communication with the degassing port when the valve rotor is in preselected rotational orientations relative to the valve housing.

10. The valve of claim 7, wherein the degassing port is parallel to and radially offset from the rotational axis of the valve rotor within the valve housing.

11. The valve of claim 6, wherein the rotational orientation further serves to set the inlet port into fluid communication with the heater port.

12. A valve for distributing and regulating the flow of coolant issuing from a water pump to a radiator, a bypass line and a heater comprising:
   a valve housing having ports formed therein including an inlet port configured to receive coolant issuing from a water pump, a first outlet port configured to direct coolant to a radiator, a second outlet port configured to direct coolant to a bypass line and a third outlet port configured to direct coolant to a heater;

a valve rotor, rotatably disposed within the valve housing, wherein the valve rotor can provide a plurality of internal fluid passages within the valve rotor to provide fluid communication between the inlet port and at least one of the first outlet port, the second outlet port and the third outlet port; and a drive mechanism that is operatively connected to the valve rotor for moving the valve rotor into at least one preselected rotational orientation.

13. The valve for distributing and regulating the flow of coolant according to claim 12, wherein the drive mechanism includes a motor.

14. The valve for distributing and regulating the flow of coolant according to claim 13, wherein the motor includes a stepper motor.

15. The valve for distributing and regulating the flow of coolant according to claim 12, wherein the drive mechanism includes a motor operatively connected to a reduction gear combination.

16. The valve for distributing and regulating the flow of coolant according to claim 12, further comprising a biasing mechanism to position the valve rotor in a preselected rotational orientation relative to the valve housing.

17. The valve for distributing and regulating the flow of coolant according to claim 16, wherein the biasing mechanism includes a spring.

18. The valve for distributing and regulating the flow of coolant according to claim 12, further comprising a biasing mechanism disposed about a shaft of the valve rotor to position the valve rotor in a preselected rotational orientation relative to the valve housing.

19. The valve for distributing and regulating the flow of coolant according to claim 12, wherein at least one internal fluid passage of the plurality of internal fluid passages includes a passage that extends down along an axis of the valve rotor.

20. The valve for distributing and regulating the flow of coolant according to claim 12, wherein at least one internal fluid passage of the plurality of internal fluid passages extends down along a central axis of the valve rotor includes an a first opening in a top portion of the valve rotor and a second opening in a bottom portion of the valve rotor.

21. A valve for distributing and regulating the flow of coolant issuing from a water pump to a radiator, a bypass line and a heater comprising:

a valve housing having ports formed therein including an inlet port configured to receive coolant issuing from a water pump, a first outlet port configured to direct coolant to a radiator, a second outlet port configured to direct coolant to a bypass line and a third outlet port configured to direct coolant to a heater;

a valve rotor, rotatable disposed within the valve housing, wherein the valve rotor can provide at least one internal fluid passage within the valve rotor to provide fluid communication between the inlet port and at least one of the first outlet port, the second outlet port and the third outlet port, wherein the at least one internal fluid passage includes a first fluid passage that extends down along a central axis of the valve rotor and the at least one internal fluid passage includes a second fluid passage that extends from the first fluid passage to a first opening in an outer surface of the valve rotor and the at least one internal fluid passage includes a third fluid passage that extends from the first fluid passage to a second opening in the outer surface of the valve rotor and the at least one internal fluid passage includes a fourth fluid passage that extends from the first fluid passage to a third opening in the outer surface of the valve rotor, wherein the first opening, second opening and third opening can be positioned by the rotation of the valve rotor via the drive mechanism to selectively control coolant flow from the inlet port to the first outlet port; and a drive mechanism that is operatively connected to the valve rotor for moving the valve rotor into at least one preselected rotational orientation.

22. The valve for distributing and regulating the flow of coolant according to claim 21, wherein the second fluid passage is axially aligned with the third fluid passage and the fourth fluid passage is substantially perpendicular to the second fluid passage and the third fluid passage to form a t-shaped fluid passage.

23. The valve for distributing and regulating the flow of coolant according to claim 12, wherein the plurality of internal fluid passages includes a first fluid passage that extends down along a central axis of the valve rotor and the plurality of internal fluid passages includes at least one second fluid passage that extends from the first fluid passage to at least one opening in the outer surface of the valve rotor, wherein the at least one opening can be selectively positioned by the rotation of the valve rotor via the drive mechanism to selectively control coolant flow from the inlet port to the first outlet port, the second outlet port and the third outlet port.

24. The valve for distributing and regulating the flow of coolant according to claim 23, wherein the at least one second fluid passage is pie-shaped.

25. The valve for distributing and regulating the flow of coolant according to claim 12, wherein at least one internal fluid passage of the plurality of internal fluid passages includes a plurality of axially extending internal fluid passages located within the valve rotor.

26. A valve for distributing and regulating the flow of coolant issuing from a water pump to a radiator, a bypass line and a heater comprising:

a valve housing having ports formed therein including an inlet port configured to receive coolant issuing from a water pump, a first outlet port configured to direct coolant to a radiator, a second outlet port configured to direct coolant to a bypass line and a third outlet port configured to direct coolant to a heater;

a valve rotor, rotatable disposed within the valve housing, wherein the valve rotor can provide at least one internal fluid passage within the valve rotor to provide fluid communication between the inlet port and at least one of the first outlet port, the second outlet port and the third outlet port, wherein the at least one internal fluid passage includes a plurality of axially extending internal fluid passages located within the valve rotor and further comprising a fourth outlet port located on a bottom portion of the valve housing, wherein the plurality of axially extending internal fluid passages includes a first fluid passage, having a first diameter, that extends down along a central axis of the valve rotor and having a first opening in a top portion of the valve rotor and a second opening in a bottom portion of the valve rotor and at least one second fluid passage that is parallel to the first fluid passage, having a second diameter that is less than the first diameter, wherein the at least one second fluid passage only extends for a portion of a length of the valve rotor to at least one third opening in a bottom portion of the valve rotor, wherein the at least one third opening can be selectively positioned by the rotation of the valve rotor via the drive mechanism to selectively provide degassing of the coolant, passing within the valve, via the fourth outlet port; and a drive mechanism that is operatively connected to the valve rotor for moving the valve rotor into at least one preselected rotational orientation.

27. The valve for distributing and regulating the flow of coolant according to claim 26, wherein the at least one second fluid passage includes at least one groove formed in the bottom portion of the valve rotor in fluid relationship with the at least one third opening in the bottom portion of the valve rotor.

28. The valve for distributing and regulating the flow of coolant according to claim 12, wherein at least one internal fluid passage of the plurality of internal fluid passages includes a gap between the valve rotor and the valve housing.

29. The valve for distributing and regulating the flow of coolant according to claim 28, further including at least one flexible seal between the valve rotor and at least one of the inlet port, the first outlet port, the second outlet port and the third outlet port to prevent fluid from flowing into the gap.

30. The valve for distributing and regulating the flow of coolant according to claim 29, wherein the flexible seal includes at least one flange portion adjacent to the valve rotor and a collar portion adjacent to and extending into the inlet port or at least one of the first outlet port, the second outlet port and the third outlet port.

31. A valve for distributing and regulating the flow of coolant issuing from a water pump to a radiator, a bypass line and a heater comprising:

a valve housing having ports formed therein including an inlet port configured to receive coolant issuing from a water pump, a first outlet port configured to direct coolant to a radiator, a second outlet port configured to direct coolant to a bypass line and a third outlet port configured to direct coolant to a heater, wherein the inlet port and first outlet port are located in a first plane and the second outlet port and the third outlet port are located in a second plane;

a valve rotor, rotatably disposed within the valve housing, wherein the valve rotor can provide at least one internal fluid passage within the valve rotor to provide fluid communication between the inlet port and at least one of the first outlet port, the second outlet port and the third outlet port; and a drive mechanism that is operatively connected to the valve rotor for moving the valve rotor into at least one preselected rotational orientation.

32. The valve for distributing and regulating the flow of coolant according to claim 31, wherein the first plane and the second plane are substantially perpendicular to a central axis for the valve rotor and the first plane and the second plane are axially spaced from each other.

33. The valve for distributing and regulating the flow of coolant according to claim 31, wherein the at least one internal fluid passage includes a first fluid passage that extends down along a central axis of the valve rotor and the at least one internal fluid passage includes a plurality of second fluid passages from the first fluid passage to at least one first surface opening in the valve rotor, wherein the plurality of second fluid passages can be positioned by the rotation of the valve rotor via the drive mechanism to selectively control coolant flow from the inlet port to the first outlet port in the first plane and from the inlet port to the second outlet port and the third outlet port in the second plane.

34. A valve for distributing and regulating the flow of coolant issuing from a water pump to a radiator, a bypass line and a heater comprising:

a valve housing having ports formed therein including an inlet port configured to receive coolant issuing from a water pump, a first outlet port configured to direct coolant to a radiator, a second outlet port configured to direct coolant to a bypass line and a third outlet port configured to direct coolant to a heater, wherein the inlet port and first outlet port are located in a first plane and the second outlet port and the third outlet port are located in a second plane;

a valve rotor, rotatably disposed within the valve housing, wherein the valve rotor can provide at least one internal fluid passage within the valve rotor to provide fluid communication between the inlet port and at least one of the first outlet port, the second outlet port and the third outlet port, wherein the at least one internal fluid passage includes a first fluid passage parallel to a central axis of the valve rotor and the at least one internal fluid passage includes a second fluid passage from the first fluid passage to a first surface opening in the valve rotor in the first plane, the at least one internal fluid passage includes a third fluid passage from the first fluid passage to a second surface opening in the valve rotor in the first plane, the at least one internal fluid passage includes a fourth fluid passage from the first fluid passage to a third surface opening in the valve rotor in the first plane, wherein the second fluid passage, the third fluid passage and the fourth fluid passage can be positioned by the rotation of the valve rotor via the drive mechanism to selectively control coolant flow from the inlet port to the first outlet port in the first plane and the at least one internal fluid passage includes at least one fifth fluid passage from the first fluid passage to at least one fourth surface opening in the valve rotor in the second plane, wherein the at least one fifth fluid passage can be positioned by the rotation of the valve rotor via the drive mechanism to selectively control coolant flow from the inlet port to the second outlet port in the second plane and the third outlet port in the second plane; and a drive mechanism that is operatively connected to the valve rotor for moving the valve rotor into at least one preselected rotational orientation.

35. The valve for distributing and regulating the flow of coolant according to claim 34, wherein the second fluid passage, the third fluid passage and the fourth fluid passage form a t-shaped fluid passage in the first plane and the at least one fifth fluid passage forms a pie-shaped fluid passage in the second plane.

36. The valve for distributing and regulating the flow of coolant according to claim 31, further comprising a biasing mechanism disposed about a shaft of the valve rotor to position the valve rotor in a preselected rotational orientation relative to the valve housing.

37. The valve for distributing and regulating the flow of coolant according to claim 31, wherein the at least one internal fluid passage includes a gap between the valve rotor and the valve housing and further including at least one flexible seal between the valve rotor and the inlet port and at least one flexible seal between the valve rotor and at least one of the first outlet port, the second outlet port and the third outlet port to prevent fluid from flowing into the gap.

38. A valve for distributing and regulating the flow of coolant issuing from a water pump to a radiator, a bypass line and a heater comprising:

a valve housing having a bottom portion and having ports formed therein including an inlet port configured to receive coolant issuing from a water pump, a first outlet port configured to direct coolant to a radiator, a second outlet port configured to direct coolant to a bypass line, a third outlet port configured to direct coolant to a heater and a fourth outlet port configured to degas coolant within the valve, wherein the inlet port and the first outlet port are located in a first plane and the second outlet port and the third outlet port are located in a second plane and the fourth outlet port is located on the bottom portion of the valve housing, wherein the first plane and the second plane are substantially perpendicular to a central axis for the valve rotor and the first plane and the second plane are axially spaced from each other;

a valve rotor, rotatably disposed within the valve housing, wherein the valve rotor can provide at least one internal fluid passage to provide fluid communication between the inlet port and at least one of the first outlet port, the second outlet port and the third outlet port; and a drive mechanism that is operatively connected to the valve rotor for moving the valve rotor into at least one preselected rotational orientation.

39. A valve for distributing and regulating the flow of coolant issuing from a water pump to a radiator, a bypass line and a heater comprising:

a valve housing having a bottom portion and having ports formed therein including an inlet port configured to receive coolant issuing from a water pump, a first outlet port configured to direct coolant to a radiator, a second outlet port configured to direct coolant to a bypass line, a third outlet port configured to direct coolant to a heater and a fourth outlet port configured to degas coolant within the valve, wherein the inlet port and the first outlet port are located in a first plane and the second outlet port and the third outlet port are located in a second plane and the fourth outlet port is located on the bottom portion of the valve housing, wherein the first plane and the second plane are substantially perpendicular to a central axis for the valve rotor and the first plane and the second plane are axially spaced from each other;

a valve rotor, rotatable disposed within the valve housing, wherein the valve rotor can provide at least one internal fluid passage to provide fluid communication between the inlet port and at least one of the first outlet port, the second outlet port and the third outlet port, wherein the at least one internal fluid passage includes a first fluid passage parallel to a central axis of the valve rotor and having a first surface opening in a top portion of the valve rotor and a second surface opening in the bottom portion of the valve rotor and the at least one internal fluid passage includes a second fluid passage from the first fluid passage to a third surface opening in the valve rotor in the first plane and the at least one internal fluid passage includes a third fluid passage from the first fluid passage to a fourth surface opening in the valve rotor in the first plane and the at least one internal fluid passage includes a fourth fluid passage from the first fluid passage to a fifth surface opening in the valve rotor in the first plane, wherein the second fluid passage, the third fluid passage and the fourth fluid passage can be positioned by the rotation of the valve rotor via the drive mechanism to selectively control coolant flow from the inlet port to the first outlet port in the first plane and the at least one internal fluid passage includes a fifth fluid passage from the first fluid passage to a sixth surface opening in the valve rotor in the second plane, wherein the fifth fluid passage can be positioned by the rotation of the valve rotor via the drive mechanism to selectively control coolant flow from the inlet port to the second outlet port in the second plane and the third outlet port in the second plane and the at least one internal fluid passage includes at least one sixth fluid passage from the first fluid passage to at least one seventh surface opening in the bottom portion of the valve rotor, wherein the at least one sixth fluid passage can be positioned by the rotation of the valve rotor via the drive mechanism to selectively provide degassing of coolant, passing within the valve, via the fourth outlet port; and a drive mechanism that is operatively connected to the valve rotor for moving the valve rotor into at least one preselected rotational orientation.

40. The valve for distributing and regulating the flow of coolant according to claim 39, wherein at least one sixth fluid passage includes dual fluid passages and the at least one seventh surface opening includes dual grooved openings, wherein the dual fluid passages extend from the fifth fluid passage to the dual grooved openings in the bottom portion of the valve rotor.

41. The valve for distributing and regulating the flow of coolant according to claim 38, wherein the at least one internal fluid passage includes a gap between the valve rotor and the valve housing and further including at least one flexible seal between the valve rotor and the inlet port and at least one flexible seal between the valve rotor and at least one of the first outlet port, the second outlet port and the third outlet port to prevent fluid from flowing into the gap.

* * * * *